United States Patent [19]

Turner et al.

[11] 4,259,298
[45] * Mar. 31, 1981

[54] RECOVERY OF CHLORINE VALUES FROM IRON CHLORIDE BY-PRODUCT IN CHLORINATION OF ALUMINOUS MATERIALS

[75] Inventors: John H. W. Turner, Stockport; Charles E. E. Shackleton, London, both of England

[73] Assignee: Mineral Process Licensing Corp. B.V., The Hague, Netherlands

[*] Notice: The portion of the term of this patent subsequent to Feb. 20, 1996, has been disclaimed.

[21] Appl. No.: 37,718

[22] Filed: May 10, 1979

Related U.S. Application Data

[63] Continuation-in-part of Ser. No. 964,090, Nov. 27, 1978, abandoned, which is a continuation of Ser. No. 848,305, Nov. 3, 1977, Pat. No. 4,140,746.

[30] Foreign Application Priority Data

May 10, 1978 [GB] United Kingdom ............... 18652/78

[51] Int. Cl.³ .......................... C01G 49/06; C01F 7/56
[52] U.S. Cl. ..................................... 423/135; 423/133; 423/138; 423/148; 423/149; 423/493; 423/467; 423/469; 423/633; 260/544 K

[58] Field of Search ............... 423/133, 135, 149, 493, 423/633, 132, 148, 467, 469; 260/544 K

[56] References Cited

U.S. PATENT DOCUMENTS

| 2,378,675 | 6/1949 | Agnew et al. | 423/149 |
| 2,852,339 | 9/1958 | Hill | 423/493 |
| 3,244,509 | 4/1966 | Norak et al. | 423/149 |
| 3,466,169 | 9/1969 | Nowak et al. | 423/149 |
| 4,094,954 | 6/1978 | Bonsack et al. | 423/149 |
| 4,140,746 | 2/1979 | Turner et al. | 423/493 |

*Primary Examiner*—Herbert T. Carter
*Attorney, Agent, or Firm*—Barry G. Magidoff

[57] ABSTRACT

The invention relates to a method of recovering the chlorine values from iron chloride obtained from the chlorination of an aluminous material containing iron oxide, such as bauxite. The method involves partially dechlorinating ferric chloride in the presence of a reducing agent to form products comprising ferrous chloride and a chloride compound derived from the reducing agent and oxidizing ferrous chloride at a temperature of about 300° C. to 1200° C. to form products comprising ferric chloride and ferric oxide. The ferric chloride is recycled and the chlorine values are recovered as the chloride of the reducing agent which is suitable for recycle to the aluminous chlorination stage or has other industrial utility.

11 Claims, 1 Drawing Figure

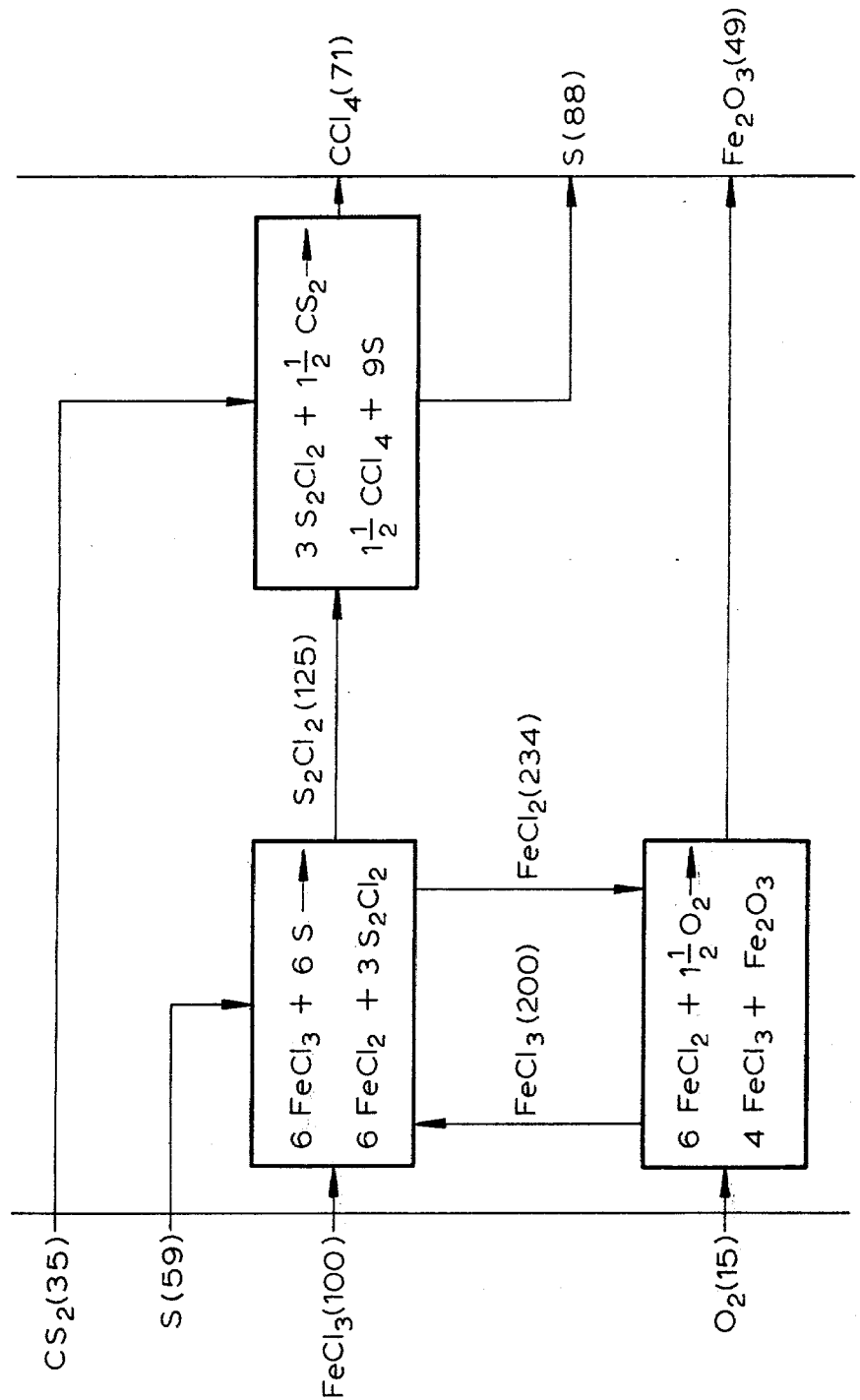

RECOVERY OF CHLORINE VALUES FROM IRON CHLORIDE BY-PRODUCT IN CHLORINATION OF ALUMINOUS MATERIALS

This is a continuation in part of co-pending application Ser. No. 964,090 filed Nov. 27, 1978, (now abandoned) which in turn was a continuation of application Ser. No. 848,305, filed Nov. 3, 1977, (now U.S. Pat. No. 4,140,746)

The invention relates to a process for the recovery of chlorine values from iron chloride obtained as a by-product from the chlorination of an aluminous material containing iron oxide, particularly bauxite.

When bauxite is chlorinated in order to extract its aluminium content as a volatile chloride by known chlorination processes and, in particular, by so-called "sulpho-chlorination" which is chlorination in the presence of sulphur at temperatures preferably between 350° C. and 650° C. significant quantities of iron chloride are usually obtained as a by-product. This iron chloride by-product may be either ferrous or ferric chloride or a combination of both, depending on the reaction conditions in the chlorinator, although it is normally ferric chloride from sulpho-chlorination.

This iron chloride by-product contains a considerable content of valuable chlorine in chemically combined form. It is desirable, therefore, to recover these chlorine values for recycling to the chlorinator. This is particularly true when the chlorination of bauxite forms the first stage in the so-called chloride route to aluminium metal, since the quantity of by-product iron chloride is then considerable.

Various attempts have been made over the past 30 years to recover the chlorine values from iron chloride, primarily within the titanium dioxide pigment industry where anhydrous chlorination techniques have been accepted more readily then in the aluminium industry.

These attempts have centered around iron chloride oxidation in which the following reaction is involved:

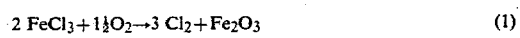
$$2 FeCl_3 + 1\tfrac{1}{2}O_2 \rightarrow 3 Cl_2 + Fe_2O_3 \tag{1}$$

However, it has proved very difficult to develop a satisfactory industrial process incorporating the reaction exemplified in equation (1).

Many efforts have been made to overcome the attendant difficulties. For example, it has been proposed to conduct the reaction represented by the equation (1) in the gaseous phase. However, temperatures at which an adequate reaction rate is obtained have been found to be too high for practical operation since at high temperatures the equilibrium of the reaction becomes increasingly unfavourable to chlorine recovery. An additional problem of vapour phase oxidation is that, in generating solid iron oxide reaction product from gaseous reactants, there is a severe tendancy for oxide scale to accumulate on the reactor walls and associated equipment, thereby causing problems in the efficient operation and maintainance of the reactor.

It was subsequently found that the reaction represented by the equation (1) is catalysed by iron oxide particles, and an iron oxide fluidised bed reactor was proposed both to lower the reaction temperature and to provide an answer to scale accumulation. However, it has been demonstrated that oxide scale nonetheless occurs above bed level, to such an extent that the reaction outlet may become completely plugged. Moreover, serious problems were encountered in increasing the size of the fluid bed reactor towards an industrial scale for this reaction.

Another proposal has been to operate the oxidation process represented by the equation (1) at lower temperatures using a salt melt to form a salt complex or eutectic with the iron compound; or by conducting the oxidation under a pressure sufficient to effect the liquifaction of the ferric chloride. However, these methods require the use of complicated apparatus and the exercise of very careful controls over operating conditions. Furthermore, difficulties are encountered in the removal of by-product iron oxide from the reactor and in the sticking of the particulate bed material when this is employed.

None of the processes previously disclosed in the patent literature for recovering the chlorine contained in iron chloride by processes which involve reaction (1) appears to have achieved commercial status despite years of effort.

The absence of a satisfactory industrial process for recovering the chlorine values from iron chloride has discouraged the use of bauxite as the raw material for the manufacture of aluminium chloride for subsequent electrolysis to aluminium metal. Instead of chlorinating bauxite, most aluminium producers use the non-chloride route to obtain aluminium metal while the one company known to be using the chloride route to aluminium metal chlorinates pure alumina. In the latter case, since the volume of material to be chlorinated is not markedly different whether a low-iron bauxite or alumina is used, it therefore means that additional expense is involved in refining bauxite to pure alumina prior to chlorination. As for the rest of the industry, the incentive to change new plant capacity to the chloride route, which in principle offers important energy savings, is significantly reduced.

Apart from economic factors, there are serious environmental implications in chlorinating alumina rather than bauxite or in electrolysing alumina directly, which is the dominant technology, in that large quantities of pollutive red mud are by-produced when bauxite is processed to alumina.

Accordingly for economic and environmental reasons there is a need in the industry for an industrially acceptable method of recovering the chlorine values from iron chloride obtained as by-product in the chlorination of aluminous material containing iron oxide particularly bauxite.

We have now found a method for recovering the chlorine values from iron chloride by-produced in the chlorination of an aluminous material containing iron oxide such as bauxite which, in contrast to the previous attempts revealed in the prior art, avoids dependence on the difficult reaction between oxygen and iron chloride (as illustrated in equation (1) to evolve chlorine and ferric oxide.

Thus the present invention provides a method of recovering the chlorine values from iron chloride obtained from the chlorination of an aluminous material containing iron oxide which comprises the steps of:

(a) partially dechlorinating the ferric chloride from oxidation step (b) plus any ferric chloride in the iron chloride separated from the aluminous material, in the presence of a reducing agent to form ferrous chloride and a chloride compound derived from the reducing agent whose chloride values are, either directly or after processing, suitable for recycle to the aluminous chlorination stage, and passing the ferrous chloride on to step (b); and (b) oxidizing the ferrous chloride produced in the dechlorinating stage (a) plus any ferrous chloride in the iron chloride separated from the aluminous material, in the presence of an oxidising agent comprising oxygen or an oxygen-containing gases and at a temperature of between about 300° C. and 1200° C. to produce products comprising ferric chloride and ferric oxide, passing the ferric chloride on to the dechlorination step (a) and removing the ferric oxide from the system; whereby the chlorine value of the iron chloride separated from the aluminous material is recovered as the chloride of the reducing agent, a material which directly or indirectly is suitable for recycle to the aluminous chlorination stage or has other industrial utility.

In the content of this invention, ferric and/or ferrous chloride obtained as a by-product from the chlorination of the aluminous material according to steps (a) and (b) may be obtained directly from the aluminous chlorination process or may result from pretreating an impure product containing iron chloride.

The method according to the present invention involves a combination of a reduction step (a) and an oxidation step (b). In the reduction step (a) ferric chloride obtained as the by-product of the chlorination of an aluminous material containing iron oxide and/or as a co-product of the oxidation step (b) is partially dechlorinated to ferrous chloride by one or more suitable reducing agents. In the oxidation step (b), ferrous chloride obtained as the by-product of the chlorination of an aluminous material containing iron oxide and/or as a product of the reduction step (a) is reacted with sufficient oxygen or molecular oxygen-containing gas at a temperature between 300° C. and 1200° C. to produce ferric chloride and ferric oxide. Ferric chloride evolved from the oxidation stage is recycled to the reduction step (a). The method according to the present invention is preferably carried out continuosly.

If the iron chloride by-product of the chlorination of the aluminous material contains a predominant or even a significant proportion of ferric chloride, it is normally desirable for the process to start with the reduction step (a).

Thus, according to one embodiment of the method according to the invention ferric chloride obtained as a by-product of the chlorination of an aluminous material such as bauxite is subjected to the partial dechlorination step (a) to form ferrous chloride and a chloride compound or compounds, and the resulting ferrous chloride is subjected to the oxidation step (b) to form ferric oxide and ferric chloride, the ferric chloride being recycled to the partial dechlorination step (a).

However, if the iron chloride by-product is predominantly ferrous choride, it is then possible for the process to start with the oxidation step (b).

Thus, according to another embodiment of the method according to the invention ferrous chloride obtained as a by-product of the chlorination of the aluminous material is subjected to the oxidation step (b) to form ferric oxide and ferric chloride; the resulting ferric chloride is then subjected to the partial dechlorination step (a) to form ferrous chloride and a chloride compound or compounds. The resulting ferrous chloride is subjected to a further oxidation step (b) and the ferric chloride resulting from the oxidation step is recycled.

Alternatively, where the iron chloride by-product from the chlorination of the aluminous material comprises both ferric and ferrous components, the ferric chloride is introduced into step (a) of the method and the ferrous chloride is introduced into step (b).

The present invention thus provides a means for dechlorinating iron chloride which does not depend on the difficult reaction exemplified in equation (1). This is achieved by dechlorinating the iron chloride in the reduction of ferric to ferrous chloride, thus leaving the relatively limited objective for the oxidation stage of converting ferrous choride to ferric oxide and ferric chloride, as in the following reaction:

$$6\ FeCl_2 + 1\tfrac{1}{2}\ O_2 \rightarrow Fe_2O_3 + 4\ FeCl_3 \tag{2}$$

Compared with the oxidation process represented by equation (1), the reaction exemplified in the equation (2) goes readily to completion at relatively moderate temperatures, thus avoiding the need for any special procedures of the type which had to be adopted in the attempts to develop a viable process involving equation (1).

The iron chloride used as starting material in the method according to the present invention is obtained as a by-product of the chlorination of an aluminous material containing of iron oxide, particularly bauxite.

In a particular embodiment of the invention the iron chloride used as the feed material in the method according to the present invention is derived as a by-product from the carbo-chlorination of bauxite, that is chlorination of bauxite in the presence of carbon or a carbon-containing reducing agent most preferably a mixture of carbon and carbon monoxide. Carbo-chorination is suitably carried out at temperatures of between 650° C. and 1000° C. The iron chloride may be produced in the ferrous and/or ferric form depending on reaction conditions, particularly the availability of chlorine. In addition to iron chloride, the reactor off gas stream will generally contain mainly aluminium chloride, $TiCl_4$, $SiCl_4$, CO and $CO_2$, together with carried over solids (carbon and bauxite). According to another embodiment of the invention the iron chloride used as the feed material is obtained from the chlorination of bauxite in the presence of sulphur and/or a sulphur-containing reducing agent.

The iron chloride by-product of sulpho-chlorination is produced as ferric chloride within the more preferred temperature range of 300° C. to 650° C. In addition to ferric chloride, the reactor off-gas stream will generally contain mainly aluminium chloride, $TiCl_4$, $SiCl_4$, and $SO_2$ together with carried-over solids (bauxite).

In both sulpho- and carbo-chlorination, the separation of the blow-over solids, using for example standard dust collection techniques, and $TiCl_4$, $SiCl_4$ and $SO_2$ or $CO/CO_2$, using for example preferential condensation of the aluminum and iron chlorides, requires only normal engineering procedures. However, the separation of the aluminium and iron chlorides condensate is less easy since aluminium-iron chloride compounds are formed from part of the mixed chlorides. The aluminium and iron chloride compounds are formed both from ferric and ferrous chloride. One method of achieving the separation is to ensure that the iron chloride is substantially in the ferric form, e.g. by adding chlorine gas, and then subjecting the mixed aluminium-iron chloride containing $AlFeCl_6$ to reflux distillation under pressure of between 3 and 4 atmospheres such that the aluminium chloride vapour is produced as the overhead product and liquid ferric chloride as the bottom product.

The ferric chloride may be brought back to atmospheric pressure and fed as a solid or a vapour to step (a) of the process according to the invention.

Another method of producing iron chloride from an aluminous material containing iron oxide to provide a starting material for the method according to the present invention is selectively to extract the iron without chlorinating the aluminum. This may be achieved, for example, by sulphiding the iron, using $CO+SO_2$ in a suitable proportion, followed by a chlorination step in which elemental chlorine is used to extract the iron as ferric chloride. This approach has the advantage of avoiding the problem of vapour phase aluminium-iron chlorides, but the disadvantage of two additional process stages.

The preferred embodiment of the reduction step will vary with the type of reducing agent used in the associated chlorination plant, the availability of the effective reducing agents for converting ferric to ferrous chloride, and the market scope for the resulting chloride compounds.

Suitable reducing agents which, directly or after further processing, produce chloride compounds suitable primarily for recycle to the chlorination process include sulphur, sulphur chlorides in which the atomic ratio of sulphur to chlorine is more than 1:1, carbon disulphide, and carbon monoxide.

In the case of sulphur, ferric chloride is reduced in the following reaction:

$$2\ FeCl_3(s) + 2S(l) \rightarrow 2\ FeCl_2(s) + S_2Cl_2(g) \tag{3}$$

(S = solid, l = liquid, g = gas)

In the case of sulphur chlorides in which the atomic ratio of sulphur to chlorine is more than 1:1, ferric choride is reduced in the following reaction, taking $S_5Cl_2$ as a typical sulphur chloride average composition:

$$3\ FeCl_3(s) + S_5Cl_2(l) \rightarrow 3\ FeCl_2(s) + 2\tfrac{1}{2}\ S_2Cl_2(g) \tag{4}$$

$S_2Cl_2$ produced in reactions (3) and (4) may either be recycled directly to the chlorinator, as would be appropriate in the case of chlorination in the presence of sulphur, or its chloride content may be processed into a form suitable for recycle to a carbo-chlorinator, e.g. by reacting sulphur monochloride with carbon bisulphide to form carbon tetrachloride and sulphur or by reacting sulphur monochloride with carbon monoxide to produce phosgene and sulphur and/or sulphur chloride, or by heating sulphur monochloride above its dissocation temperature (444° C.) and cooling the resulting gas rapidly to produce chlorine and chlorine polysulphides.

In the case of carbon bisulphide, ferric chloride is reduced in the following reaction:

$$6\ FeCl_3(s/g) + CS_2(g) \rightarrow 6\ FeCl_2(s) + CCl_4(g) + S_2Cl_2(g) \tag{5}$$

Carbon tetrachloride produced in equation (5) is directly suitable for recycle to a carbo-chlorinator, and co-product $S_2Cl_2$ can be made readily so by reaction with carbon bisulphide. The reaction exemplified in equation (5) is preferably initiated by sulphur or a sulphur chloride.

In the case of carbon monoxide, ferric chloride is reduced in the following reaction:

$$2\ FeCl_3(s/g) + CO(g) \rightarrow 2\ FeCl_2(s) + COCl_2(g) \tag{6}$$

Phosgene produced in equation (6) may be recycled directly to a carbo-chlorinator. The reaction exemplified in equation (6) is preferably initiated by the presence of sulphur or a sulphur chloride.

Reducing agents which are not suitable for recycle to the chlorinator but which have other industrial utility include unsaturated hydrocarbons such as acetylene which readily undergo additional reactions. In the case of acetylene, tetrachloroethane is produced in the dechlorination of ferric chloride without the by-production of HCl. Other possible suitable reducing agents include hydrogen and saturated hydrocarbons such as methane but these are less preferred.

One preferred embodiment of the reduction step is cited below, by way of example.

One method of carrying out the reduction step, which would be suitable where the iron chloride feed material is derived from the carbo-chlorination of the aluminous material such as bauxite, involves reacting sulphur with ferric chloride, as illustrated in equation (3).

Solid ferric chloride in powder form and liquid sulphur are fed continuously and separately to an enclosed heated reactor, e.g. a troughed reactor, with the ferric chloride slightly in excess of a stoichiometric proportion. The troughed reactor is suitably provided with a screw conveyer and stirrer. It may be necessary to employ a number of troughed reactors in series in order to realise a sufficiently complete reaction, but only one is assumed for the purpose of this description. The troughed reactor is suitably provided with a jacket for conveying a heat transfer fluid which would be operated to develop an increasing temperature inside the reactor as the material passes along it. The reactants are heated on entry to the reactor to the initiation temperature of about 115° C., and thereafter the heat is built up to a maximum of 400° C. towards the reactor exit. Solid ferrous chloride and gaseous sulphur monochloride, containing a small proportion of unreacted ferric chloride, are continuously withdrawn from the reactor. The sulphur monochloride is condensed to a liquid and reacted with sufficient carbon bisulphide to convert it to carbon tetrachloride and sulphur, according to equation (7) by the following known reaction:

$$S_2Cl_2(l) + \tfrac{1}{2}\ CS_2(l) \rightarrow \tfrac{1}{2}\ CCl_4(l) + 3\ S(s) \tag{7}$$

The sulphur by-product is recycled to the reduction step (a) and for carbon bisulphide manufacture. The carbon tetra chloride product is then available for recycle to the carbo-chlorinator or for use in another chemical process.

A particularly preferred method of carrying out the reduction of ferric chloride to ferrous chloride is with sulphur monochloride as the reducing agent, such that sulphur dichloride is formed as in equation (8).

$$FeCl_6(g) + S_2Cl_2(g) \rightarrow 2\ FeCl_2(s) + 2\ SCl_2(g) \tag{8}$$

A main advantage of this reduction process as compared to the reduction of ferric chloride using liquid sulphur, as previously described, is that it permits the use of a gas-fluidised bed reactor, with the bed composed predominantly of solid ferrous chloride.

The reaction conditions of the oxidation step (b) are less subject to variations and alternatives depending on industrial circumstances than is the reduction stage. The oxidation reaction is carried out at a temperature between 300° C. and 1200° C. preferably between 300° C. and 900° C. and more particularly between 450° C. and 650° C.

According to a preferred embodiment of the method according to the invention, the oxidation of ferrous chloride according to equation (2) is carried out in a fluid bed of the product, ferric oxide, into which the reactants are fed continuously in approximately stoichiometric proportions and from which gaseous ferric chloride and solid ferric oxide are continuously removed. The bed temperature is preferably maintained between 450° C. and 650° C.

In order to minimise escape of any oxygen from the reaction bed, it is desirable to maintain a small quantity, for example, 0.25 to 2.5% by weight, of ferrous chloride in the bed of predominantly iron oxide. In this way, the troublesome vapour phase reaction between ferric chloride and oxygen which can cause ferric oxide accretions on the reactor walls above the bed and in the outlets can be substantially avoided.

Since the reaction defined in equation (2) is only mildly exothermic, it is normally necessary to add heat to the reactor. This can be done most economically by feeding a small quantity carbon, for example 1 to 2% by weight of the ferrous chloride feed, which is combusted to $CO_2$ within the reaction bed, using oxygen in preference to dry air.

The reactor bed overflow consists mainly of iron oxide contaminated by a small proportion of ferrous chloride. The ferrous chloride contaminant is preferably removed by purging the bed overflow with oxygen such that the evolved ferric chloride, together with any unreacted oxygen, is directed into the main reactor bed.

The gaseous ferric chloride produced in the oxidation stage, after cycloning out entrained particles of iron oxide, is recycled to the reduction step (a).

The accompanying flow sheet illustrates one preferred embodiment of the method according to the present invention involving a combination of reduction and oxidation stages as previously described. This embodiment would be suitable e.g. where the iron chloride feed material is derived from the carbo-chlorination of the aluminous material. It is assumed that the iron chloride feed is all ferric chloride. The approximate quantities (in tonnes) of the main inputs to, outputs from and internal flows in the process are shown per 100 tonnes of input ferric chloride. The inputs are shown on the left of the flowsheet and the outputs are shown on the right. The reactions taking place in the three main process stages are also identified.

The invention is further illustrated by the following Examples which, with the exception of Example 4, for the sake of convenience, have been carried out on a batch procedure.

EXAMPLE 1

Stage A

Ferric chloride obtained from the chlorination of sulphided bauxite was charged in solid powder form together with reagent grade flowers of sulphur to a reaction flask. Care was taken during transfer to the flask to minimise the contact of the reactants with moist air as ferric chloride especially is very hygroscopic. The reactants within the sealed flask were then thoroughly mixed by shaking together since it has been found in previous experimental work that preliminary mixing was of primary importance in achieving a good reaction. The charge weight of ferric chloride was 100 grams, and the sulphur was approximately stoichiometric according to equation (3). The reaction flask was connected to a condenser and to a nitrogen line. The reactor and condenser were flushed with nitrogen to displace oxygen and moisture before initiating the reaction. The reaction was initiated by heating the flask reactor with a mantle furnace to a temperature above the melting point of sulphur. Thereafter, the bed temperature was increased slowly over the reaction period up to a final temperature of 400° C. The total reaction period was 2 hours. The solid reactor product had the following analysis:

$FeCl_3$:0.3%, S:0.3%, $FeCl_2$:99%.

The physical nature of the ferrous chloride product was a mixture of lumps and fines, the lumps consisting of many small crystals which were readily broken down into fine material. The gaseous sulphur monochloride product was condensed in the water-cooled condenser and collected in a flask. In contained no ferric ions and had a liquid gravity of 1.677.

Stage B 450 grams of ferrix oxide in powder form and 75 grams of ferrous chloride (manufactured in Stage A above) were thoroughly mixed together. The material was then charged to a vertical stirred bed reactor to rest on a sintered disc at the reactor's base. The material was heated up to 550° C. using external heaters around the reactor cylinder. Throughout the heat up, nitrogen was introduced through the sintered disc to purge the material and the reactor system of any moisture or oxygen.

During heat-up, HCl gas was identified at the exit of the condenser in line after the reactor, indicating that there was some loss of chloride during the heat-up, although the losses were small in proportion to the chloride input to the reactor as can be seen from the results below. When bed temperature stabilised at 550° C., the nitrogen flow was discontinued and oxygen (dried with $CaCl_2$) was introduced through the sintered disc. The flow rate was 500 mls per minute. Total running time was 30 minutes, although the reaction was apparently completed sooner. $FeCl_3$ was evolved and was collected in the condenser. The weight of ferric chloride was 57 g which was 93% of the theoretical amount, as per equation 2. 0.7 grams of chlorine were collected in a Kl bubbler downstream of the condenser. The iron oxide residue weight was 464.4 grams which was close to the theoretical weight as per equation 2. The residue contained no iron chloride.

Stage C

The ferric chloride produced in stage B was recycled to stage A.

EXAMPLE 2

The method was carried out according to Example 1 except that the following procedure was employed in place of stage A: 100 grams of ferric chloride, similar to that used in Example 1, and one gram of reagent grade flowers of sulphur, were thoroughly mixed together in an enclosed flask and then transferred to a vertical stirred bed reactor to rest in a sintered disc at the reactors base. Care was taken to minimise the contact of the reactants with moist air. The material and reactor system were flushed with nitrogen through the sintered disc; and the bed temperature was raised to 70° C. using external heaters. When the bed temperature reached 70°

C. analytical grade $CS_2$ substituted for nitrogen and the bed temperature was raised steadily to a maximum of 200° C. The $CS_2$ flow rate was 0.9 mls per minute. When the bed temperature reached 110° C., condensate started appearing in the cooled condenser downstream of the reactor. The run continued for sufficient time to provide an excess of $CS_2$ over that required stoichiometrically according to equation (5). The bed residue was a grey-brown colour and very friable. It contained 42% ferrous iron and 1% ferric iron. Since previous work at this reaction with analytical grade $CS_2$ alone had given no identifiable reaction under these conditions, the need for a reaction initiator like sulphur or sulphur chloride demonstrated.

EXAMPLE 3

The method was carried out according to Example 1 except that the following procedure was employed in place of Stage A: 100 grams of ferric chloride, similar to that used in Example 1, were charged to a vertical stirred bed reactor to rest on a sintered disc at the reactors base. The ferric choride and the reactor system were thoroughly flushed with nitrogen while the bed temperature was increased to 150° C. CO was then substituted for nitrogen and introduced through the sintered disc a flow rate of 166 mls per minute. Shortly after starting the CO, 2 grams of $S_2Cl_2$ were volatilised into the reactor bed through a separate gas line to the one carrying CO. After the introduction of $S_2Cl_2$, no condensate appeared in the cooled condenser downstream of the reactor, until the run was nearing completion. An excess of CO over that required stoichiometrically according to equation (6) was used. A chloride compound, presumed to be phosgene, was absorbed in a caustic soda bubbler downstream of the cooled condenser. The bed residue had a similar appearance to that of Example 2 and contained 40% ferrous iron and 2% ferric iron. Previous work using CO alone for this reaction under these conditions had shown no identifiable reaction, thus indicating the need for an activator like sulphur or sulphur chloride.

EXAMPLE 4

The method was carried out as described in Example 1, except that the following procedure was employed in place of Stage B.

The reaction was carried out on a continuous basis in a fluidised bed reactor of 100 mm internal diameter. Before initiating the reaction approximately 5% by weight of solid ferrous chloride was added to the fluidised bed which consisted of approximately 4 kg of iron oxide particles giving a bed depth of 200 mm, i.e. an aspect ratio of 2:1. The bed was fluidised with nitrogen to ensure good mixing 5% ferrous chloride with the iron oxide, and the temperature was equilibriated at 600° C. The reaction was initiated by the addition of 4 liters per minute oxygen with 3 liters per minute nitrogen, the latter serving to assist fluidisation behaviour. Simultaneously a feed of 90 grams per minute solid ferrous chloride was introduced into the bed to react with the oxygen to give ferric chloride and iron oxide while maintaining a small percentage of excess ferrous chloride in the bed. After allowing time for conditions to stabilize, a sample of the off-gases was taken from a point immediately after the furnace exit and was analysed for chlorine, oxygen and ferric chloride. The molar ratios of these products was found to be as follows:

$Cl_2$: 0.022; $O_2$: 0.004; and $FeCl_3$: 1.

After stopping the flows of oxygen and ferrous chloride, the bed was sampled and analysed for residual ferrous chloride giving a result of 0.01% by weight $FeCl_2$. This demonstrated that the 5% w/w $FeCl_2$ initially added to the bed had been consumed and that a low excess level of $FeCl_2$ is adequate to consume all oxygen.

We claim:

1. A method of recovering the chlorine value from iron chloride obtained from the chlorination of an aluminous material containing iron oxide which comprises the steps of:
   (a) partially dechlorinating the ferric chloride from oxidation step (b) plus any ferric chloride in the iron chloride separated from the aluminous material, in the presence of a reducing agent to form products comprising ferrous chloride and a chloride compound derived from the reducing agent whose chlorine value is, either directly or after processing, suitable for recycle to the aluminous chlorination stage, and passing the ferrous chloride on to step (b); and
   (b) oxidizing the ferrous chloride produced in the dechlorinating stage (a) plus any ferrous chloride in the iron chloride separated from the aluminous material, in the presence of an oxidizing agent selected from the group consisting of oxygen and oxygen-containing gases and at a temperature of between about 300° C. and 1200° C. to form products comprising ferric chloride and ferric oxide, passing the ferric chloride on to the dechlorination step (a) and removing the ferric oxide from the system: whereby the chloride value of the iron chloride separated from the aluminous material is recovered as the chloride of the reducing agent, a material which directly or indirectly is suitable for recycle to the aluminous chlorination stage.

2. The method according to claim 1 wherein the aluminous material is bauxite.

3. The method according to claim 1 wherein the iron chloride feed material is obtained from the chlorination of an aluminous material in the presence of a reducing agent selected from the group consisting of carbon and carbon-containing reducing agents.

4. The method according to claim 1 wherein the iron chloride feed material is obtained from the chlorination of an aluminous material in the presence of a reducing agent selected from the group consisting of sulphur and sulphur-containing reducing agents.

5. The method according to claim 1 wherein the reducing agent used in the partial dechlorination step (a) selected from the group consisting of sulphur, sulphur chlorides in which the atomic ratio of sulphur to chlorine is more than 1:1, carbon disulphide and carbon monoxide.

6. The method according to claim 5, wherein the reducing agent is selected from the group consisting of liquid sulphur and liquid sulphur chlorides wherein the ferric chloride is in solid form and wherein the products are solid ferrous chloride and a gaseous high-sulphur, sulphur chloride.

7. The method according to claim 5, wherein the reducing agent is gaseous carbon disulphide in the presence of sulphur or a sulphur chloride, wherein the ferric chloride is in solid and/or gaseous form and wherein the products are solid ferrous chloride, gaseous carbon tetrachloride and a gaseous high-sulphur, sulphur chloride.

8. The method according to claim 5, wherein the reducing agent is gaseous carbon monoxide in the presence of sulphur or a sulphur chloride, wherein the ferric chloride is in solid and/or gaseous form and wherein the products are solid ferrous chloride and gaseous phosgene.

9. The method according to claim 1, wherein the oxidation step (b) is performed at a temperature between about 450° C. and 650° C.

10. The method according to claim 1, wherein the oxidation step (b) is performed in a fluidised bed comprising ferric oxide and from which gaseous ferric chloride and solid ferric oxide are continuously removed.

11. A method of recovering the chlorine value from iron chloride obtained from the chlorination of an aluminous material containing iron oxide which comprises the steps of:
(a) partially dechlorinating the ferric chloride obtained from oxidation stage (b) plus any ferric chloride in the iron chloride separated from the aluminous material in the presence of a reducing agent selected from the group consisting of unsaturated hydrocarbons which readily undergo addition reactions with chlorine to form ferrous chloride and chlorinated hydrocarbon, and passing the ferrous chloride on to stage (b); and
(b) oxidizing the ferrous chloride produced in the dechlorinating stage (a) plus any ferrous chloride in the iron chloride separated from the aluminous material in the presence of an oxidizing agent selected from the group consisting of oxygen and oxygen-containing gases, at a temperature in the range of between about 300° C. and about 1200° C. to produce a ferric chloride and ferric oxide; passing the ferric chloride on to the dechlorination stage (a) and removing the ferric oxide from the reaction system;
whereby the chlorine value in the iron chloride is regained as the chlorinated hydrocarbon.

* * * * *